United States Patent
Wiss et al.

(10) Patent No.: US 12,392,728 B2
(45) Date of Patent: Aug. 19, 2025

(54) METHOD FOR MEASURING THE GEOMETRY OF A GLAZING BY PROJECTION OF A RANDOM LIGHT PATTERN

(71) Applicant: SAINT-GOBAIN GLASS FRANCE, Courbevoie (FR)

(72) Inventors: Céline Wiss, Caumont sur Durance (FR); Paul Leplay, Robion (FR); Adrien Carlu, Avignon (FR); Vincent Marc Gleize, Avignon (FR); Flavien Fremy, Brookline, MA (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 318 days.

(21) Appl. No.: 17/798,469

(22) PCT Filed: Feb. 9, 2021

(86) PCT No.: PCT/EP2021/053101
§ 371 (c)(1),
(2) Date: Aug. 9, 2022

(87) PCT Pub. No.: WO2021/160618
PCT Pub. Date: Aug. 19, 2021

(65) Prior Publication Data
US 2023/0099412 A1    Mar. 30, 2023

(30) Foreign Application Priority Data
Feb. 10, 2020   (FR) ...................................... 2001283

(51) Int. Cl.
*G01N 21/88* (2006.01)
*G01N 21/958* (2006.01)

(52) U.S. Cl.
CPC ....... *G01N 21/8806* (2013.01); *G01N 21/958* (2013.01); *G01N 2021/8887* (2013.01)

(58) Field of Classification Search
CPC ............. G01N 21/8806; G01N 21/958; G01N 2021/8887; G01N 2021/8829; G01N 2021/9586; G06T 7/0002
See application file for complete search history.

(56) References Cited

U.S. PATENT DOCUMENTS 5,835,218 A * 11/1998 Harding ............. G01B 11/2441
                                                  250/237 G
6,101,269 A    8/2000 Hunter et al.
(Continued)

FOREIGN PATENT DOCUMENTS

| CN | 107564091 A | 1/2018 |
| CN | 109000578 A | 12/2018 |

OTHER PUBLICATIONS

International Search Report as issued in International Patent Application No. PCT/EP2021/053101, dated May 7, 2021.
Skydan, O.A., et al., "3D shape measurement of automotive glass by using a fringe reflection technique," Measurement Science and Technology, vol. 18, No. 1, Jan. 2007, XP020118464, pp. 106-114.
(Continued)

*Primary Examiner* — Hwa Andrew Lee
(74) *Attorney, Agent, or Firm* — Pillsbury Winthrop Shaw Pittman LLP

(57) ABSTRACT

A computer-implemented method for measuring the three-dimensional geometry of a mineral glass-based glazing during or just after a temperature shaping operation. The method implements digital processing and calculations, based on the principles of stereocorrelation, of digital images of a random light pattern projected onto the surface of a transparent glazing. It makes it possible in particular to determine the shape or the three-dimensional geometry of a (Continued)

transparent glazing, the surface of which not be totally opacified and/or which radiates under the effect of temperature.

20 Claims, 2 Drawing Sheets

(56) References Cited

U.S. PATENT DOCUMENTS

2009/0009774 A1 1/2009 Himmi et al.
2023/0099412 A1* 3/2023 Wiss .................... G01N 21/958
                                                                    382/141

OTHER PUBLICATIONS

Beaubier, B., et al., "CAD-based calibration and shape measurement with stereoDIC : Principle and application on test and industrial parts," Experimental Mechanics, vol. 54, No. 3, Sep. 2013, XP055745376, pp. 329-341.

Mohagheghian, I., et al., "Deformation and damage mechanisms of laminated glass windows subjected to high velocity soft impact," International Journal of Solids and Structures, vol. 109, Jan. 2017, XP029901404, pp. 46-62.

Dufour, J.-E., et al., "CAD-based Displacement Measurements with Stereo-DIC," Experimental Mechanics, vol. 55, No. 9, Jul. 2015, XP035603232, pp. 1657-1668.

Dufour, J.-E., et al., "Chapter 43: Shape measurement using CAD-based stereo-DIC," Structural Dynamics and Renewable Energy, vol. 1, Jan. 2014, XP009523817, pp. 333-338.

* cited by examiner

METHOD FOR MEASURING THE GEOMETRY OF A GLAZING BY PROJECTION OF A RANDOM LIGHT PATTERN

CROSS-REFERENCE TO RELATED APPLICATIONS

This application is the U.S. National Stage of PCT/EP2021/053101, filed Feb. 9, 2021, which in turn claims priority to French patent application number 2001283 filed Feb. 10, 2020. The content of these applications are incorporated herein by reference in their entireties.

TECHNICAL FIELD

The invention relates to a method for measuring the three-dimensional geometry of a mineral glass-based glazing during or just after a temperature shaping operation. In particular, it enables the three-dimensional geometry of the glazing to be measured directly in, or at the outlet of, a furnace used for the shaping operation.

TECHNICAL BACKGROUND

Transport vehicles, particularly motor vehicles, are increasingly equipped with smart driver assistance systems (ADAS for Advanced Driver Assistance System). Among other functionalities, these on-board systems can provide real-time information on the state of road traffic and/or on the state of the equipment and mechanical and/or electrical elements of the vehicle, evaluate the driver's state of tiredness or distraction, detect, and anticipate potential hazards in the environment outside the vehicle, or else help the driver to perform certain difficult manoeuvres such as overtaking other vehicles or parking.

To work, these systems integrate numerous devices or sensors making it possible to collect data relating to the driver, the vehicle and/or the environment thereof. Some systems, for example parking assistance systems, autonomous driving systems or collision warning systems, implement one or more optical image acquisition devices or devices for measuring the outside environment of the vehicle. These devices are generally arranged within the vehicle, behind one of the glazings of said vehicle, said glazing then generally having a protective function for this device. They can also be directly incorporated in the glazing, for example between two glass sheets of a laminated glazing, one sheet of which is provided with a cavity to accommodate it.

The glazing can be any one of the customary vehicle glazings: windscreen, rear window or side windows. Most commonly, the optical devices are arranged behind the windscreen to acquire information from the front of the vehicle.

For the on-board smart systems which implement optical recording devices or measuring devices arranged behind the glazings to be able to function optimally, it is necessary for the data acquired by said optical devices to be reliable, particularly to be devoid of any optical artefact. In addition, said glazings should have sufficient optical quality to prevent optical defects and/or aberrations such as spherical aberrations, chromatic aberrations, astigmatism, or coma.

Furthermore, vehicle glazings, in particular windscreens, can also be used as transparent projection screens in order to superimpose an information display, particularly information originating from the on-board smart systems, in the field of view of an operator regarding an environment which they are observing through these screens. In vehicles, these glazings are particularly known in the form of head-up displays (HUD), which enable the driver to visualise cognitive information such as the speed of the vehicle or the directions of a route to follow directly on a windscreen without having to look away from it. For the drivers comfort, and in order to prevent incongruous superposition of the cognitive information with the observed environment, it is necessary that the display of said information is not optically distorted, offset or shifted. The glazings must be devoid of optical defects and/or aberrations which are liable to cause such defects and/or aberrations.

The manufacture of glazings in the field of transport, such as motor vehicles, in particular motor vehicle windscreens, generally comprises a step of shaping mineral glass sheets in order to give them a certain curvature. This curvature, the radii of curvature of which may vary along the whole surface of the glass sheet, is necessary in order for the glazing formed by the glass sheets to be able to be attached or inserted on or in the vehicle framework. This contributes, inter alia, to the general appearance desired by the vehicle manufacturer, to the mechanical, thermal and acoustic performance of the zones for attaching and inserting the glazing into the framework, thus to the optical performance of the glazing, depending on whether it is used as a windscreen or side window.

The curvature is applied to the glass sheets of the glazing before they are assembled to form the final glazing. It is known to use bending methods which enable the simultaneous shaping of the glass sheets of the glazing, since these glass sheets thus have exactly the same curvatures. In the case of laminated glazings for windscreens, two glass sheets are placed on one another and are supported along their marginal end parts substantially horizontally by a frame or skeleton having the definitive profile of the glazing after assembly. The two glass sheets are then introduced into a bending furnace and the shaping operation is carried out at a "shaping" temperature at which the glass can be plastically deformed. For glazings based on soda-lime-silica mineral glass, the shaping temperature is generally between 400° C. and 650° C.

Similar shaping processes are used for shaping the other customary vehicle glazings: windscreen, rear window, side windows.

There are numerous optical methods which make it possible to measure the shape or three-dimensional geometry of a transparent glazing based on a mineral glass. In these methods, due to the transparency of the glazing, it is generally necessary to make the surface of the glazing completely opaque the surface of the glazing. Without this opacification, it is difficult to distinguish the glazing from the rest of the environment by means of the optical device.

Consequently, most of these methods are based on projecting and observing a succession of periodic patterns, particularly using test patterns such as fringes or grids, on the surface of the glazing. Digital processing of the images then makes it possible to calculate the phase shifts between the patterns, with these shifts being correlated to variations in the curvature and shape of the glazing.

SUMMARY OF THE INVENTION

Technical Problem

The current methods are not suited to measuring on transparent glazings for which the surface cannot be completely opacified. Furthermore, the temperatures at which the glazings are shaped may cause them to radiate, often intensely, particularly in or at the outlet of the furnace used in the shaping process. It is particularly difficult to detect optical anomalies when the glass sheets radiate because, since the optical devices are partially or totally blinded by the radiation, the images are no longer of sufficient quality for measuring phase shifts between periodic patterns.

Currently, therefore, optical defects and/or aberrations associated with the curvature or shape of the glazing are generally only detected during the optical quality checks after the glass sheets of the glazing have cooled. During the latency between the moment when the defect is generated and the moment when it is detected, the glass production is not stopped and the glass produced during this period cannot be sold to the client or used, due to the presence of defects and/or aberrations. This therefore results in a dual loss, both in terms of material and money, for the manufacturer. It is therefore desirable to detect the presence of defects and/or aberrations as early as possible in order to be able to quickly act on the shaping process so as to eliminate the source of said defects and/or aberrations and to thereby reduce glass losses.

Solution to the Technical Problem

The present invention solves these problems. It relates to a computer-implemented method as described in claim 1, with the dependent claims being advantageous embodiments. It also relates to a method for measuring the three-dimensional geometry of a transparent glazing based on mineral glass as described in claim 5, with the dependent claims being advantageous embodiments. The invention also relates to a system for implementing this method.

DETAILED DESCRIPTION OF EMBODIMENTS

Figure 1:
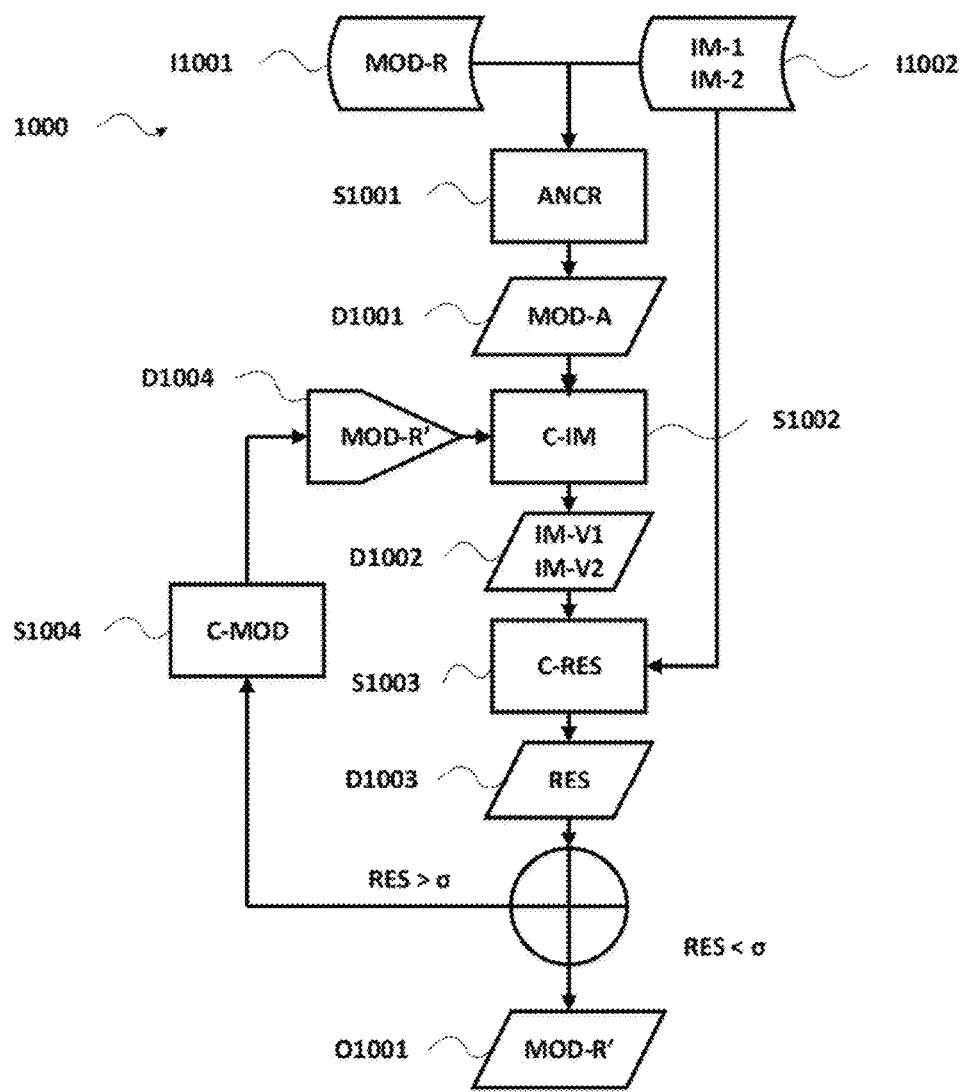
FIG. 1 depicts, in the form of a logic diagram, a method for determining the three-dimensional geometry of a glazing in accordance with the invention.

As shown in FIG. 1, the invention relates to a computer-implemented method 1000 for determining the three-dimensional geometry of a transparent glazing based on a mineral glass, said method using, as input data I1001 and I1002:

a digital reference model MOD-R of the three-dimensional geometry of the glazing, and at least two digital images IM-1 and IM-2 of a random light pattern projected onto the surface of the glazing, said images representing said pattern at two different observation angles relative to a normal to the surface of the glazing;

said method providing, as output data O1001, a digital model MOD-R' of the three-dimensional geometry of said glazing;

said method comprising:

(a) a step S1001 of anchoring ANCR the digital reference model MOD-R to one of the digital images IM-1 and IM-2 by means of at least three anchoring points (this step provides, as output data D1001, a digital model denoted MOD-A which is used as input data for step S1002);

(b) a step S1002 of calculating, based on the digital reference model MOD-R, two virtual digital images IM-V1 and IM-V2 of the glazing at the same two observation angles as those of the two digital images IM-1 and IM-2 provided as input data I1002 (this step provides, as output data D1002, two virtual digital images IM-V1 and IM-V2 which are used as input data for step S1003);

(c) a step S1003 of calculating the residues C-RES corresponding to the differences between the virtual images obtained in step (b) and the digital images IM-1 and IM-2 provided as input data I1002 (this step provides, as output data D1003, the residues RES which are used as input data for step S1004);

(d) a step of iterating S1004 steps (b) and (c), each iteration comprising a step of calculating C-MOD a modified digital model MOD-R' based on a prior modified digital model MOD-R' provided as input data D1004 for said step (d), so as to minimise the values of the residues RES until they are under a previously defined threshold value a (at each iteration S1004, the calculation step C-MOD provides, as output data D1004, a digital model which is used retroactively as input data for step S1002), the modified digital model MOD-R' then corresponding to the output data O1001.

The calculation steps C-IM, C-RES and C-MOD of the method according to the invention are based on the mathematical principles of methods for stereocorrelation of digital images. These methods make it possible to determine variations in the shape of an object by calculating the displacement of this object from a processing of digital images of this object at different observation angles. Detailed examples of algorithmic implementation of steps (b) to (d) of the method according to the invention are described in the articles by Dufour et al., Shape measurement using CAD-based stereo-DIC, Advancement of Optical Methods in Experimental Mechanics, 2014, 3:333-338, and Beaubier et al., CAD-based calibration and shape measurement with Stereo-DIC, Experimental Mechanics, 2014, 54[3]:329-341.

It has been observed, surprisingly, that implementing these steps on digital images of a random light pattern projected onto the surface of a transparent glazing, with said images representing said pattern at two different observation angles, made it possible to determine the shape or the three-dimensional geometry of a transparent glazing, the surface of which not be totally opacified and/or which radiates under the effect of temperature.

The method according to the invention directly determines the shape of the glazing using the iterative modeling of virtual digital images, first based a digital reference model then compared to real digital images of the glazing. This has the advantage that the method according to the invention makes it possible to determine the shape or three-dimensional geometry of the glazing even if the surface of the glazing cannot be completely opacified.

In contrast, indirect methods based on calculating the phase shift between successive periodic patterns require complete opacification in order to enable the complete shape of the glazing to be measured.

Thus, in the method according to the invention, the use of a random light pattern which enables partial opacification of the surface is sufficient to enable the shape and three-dimensional geometry of a glazing to be determined.

In addition, the random light pattern makes it possible to obtain, in a single acquisition, a digital image which in itself provides a large amount of spectral information in all the directions of the plane of the surface of the glazing. In contrast, indirect methods based on using periodic patterns require as many images as patterns, since each pattern only makes it possible to obtain a single item of spectral information in a single direction. The use of a single pattern is sufficient where indirect methods require the use of a succession of a plurality of periodic patterns. The acquisition of the digital images to be provided as input data for the method according to the invention is therefore simplified.

For these reasons, the method according to the invention is particularly effective for determining the shape and three-dimensional geometry of a glazing, the surface of which cannot be completely opacified.

Another advantage is that the method according to the invention does not require as high quality digital images of the pattern as required by indirect methods, since no phase shift calculation is performed. Thus, by virtue particularly of the random light pattern, the digital images, when they are used in accordance with the invention, are of sufficient quality to determine the geometry of the glazing, even if the radiation of the glazing under the effect of temperature is liable to partially blind the optical device used for acquiring said images.

The previously defined threshold value σ depends on the precision and speed of convergence sought for obtaining the modified digital model MOD-R' which then corresponds to the output data O1001. It is defined according to the complexity of the shape or three-dimensional geometry of the glazing.

In one embodiment of the invention, the light pattern is formed of light dots randomly distributed on the surface of the glazing and has a random distribution in terms of size and light density. The embodiment is advantageous since it makes it possible both for the surface to be partially opacified and for digital images of the surface to be obtained with an optimal quality for executing the calculation steps of the method according to the invention. In addition, it can be readily implemented in common bending methods in which a pulverulent material is dispersed between the surfaces of several stacked glass sheets which are shaped simultaneously.

The method according to the invention has been developed in the context of measuring the shape or three-dimensional geometry of transparent glazings, the temperature of which causes them to radiate. However, it is also suitable for measuring the shape or three-dimensional geometry of any transparent glazing, regardless of the temperature thereof, particularly also for any transparent glazing, the temperature of which does not cause it to radiate.

The digital reference model of the three-dimensional geometry of the glazing used as input data is a virtual three-dimensional model of the glazing having the shape or spatial geometry sought for this glazing as it is being shaped. This model is a three-dimensional model. It may particularly be a model established in the context of a computer-aided design (CAD).

In step (a) of anchoring the digital reference model to one of the digital images by means of at least three anchoring points, this involves manually or automatically matching spatial points or spatial zones of the glazing of the digital reference model with corresponding spatial points or spatial zones of the glazing of said digital image. This step has a function of calibration by fixing the geometrical constraints, enabling the method to converge on a satisfactorily precise result.

The spatial matching points or spatial matching zones may advantageously be geometrical invariants which are unlikely, or not very likely, to be adversely affected by a variation in the geometry or shape of the glazing. These invariants may for example be edges, corners or angles of the glazing.

According to the invention, the anchoring of step (a) is carried out by means of three anchoring points. Three anchoring points are generally sufficient to obtain a coherent convergence and satisfactory precision for the method. If the glazing has an unusual or unique shape or geometry, or if a better convergence and/or precision is sought, the number of anchoring points can be higher. In particular, it may be four, five or even six.

The method according to the invention uses, as input data, at least three digital images of a random light pattern projected onto the surface of the glazing, said images representing said pattern at two different observation angles. In other words, the method according to the invention can be implemented immediately or subsequently on the images after they are acquired, independently of the digital optical device(s) used to acquire them. This has the particular advantage of enabling a centralised implementation of the method on a central computing system to which several production lines are connected, in which production lines digital optical devices suitable for acquiring such images are provided. In particular, the method can be adapted to cloud computing.

To this end, another subject of the invention is a computer program comprising instructions which, when the program is executed by a computer, cause said computer to execute the steps of the method of the invention. Any type to of programming language, compiled into a binary form or interpreted directly, can be used to implement the steps of the method by a sequence of arithmetic or logic instructions which can be executed by a computer or any programmable information processing system. The computer program may be part of software, that is a set of executable instructions and/or one or more datasets or databases.

All or part of the computer program can be stored on a computer-readable storage medium. Another subject of the invention is a computer-readable storage medium comprising instructions which, when they are executed by a computer, cause said computer to execute the steps of the method of the invention. Preferably, this storage medium is a non-volatile or permanent computer memory, for example a solid state drive or flash memory. It may be removable or integrated in the computer, which reads the content thereof and executes the instructions therein.

The storage medium can also be integrated in a computer, referred to as "server", which is different from that which executes the instructions, referred to as "client". In order to execute the instructions contained in the storage medium, the "client" computer can access the memory space of the "server" computer by a suitable physical and/or wireless telecommunication means. The "server" computer can thus read the storage medium on which the computer program is stored and communicate the instructions in binary form to the "client" computer by any telecommunication means.

It can also be advantageous for the storage medium to be a removable medium or a medium which is remotely accessible by a telecommunication means, in order to facilitate the distribution thereof into all locations where the method of the invention is liable to be used.

The computer program and/or the storage medium according to the invention can advantageously form part of, or be implemented in, an architecture which provides computer resources on demand, such as cloud computing. Such an implementation makes it possible to centralise the deployment, updating and allocation of computing resources in all locations where the method of the invention is liable to be used. Distribution and use are thus facilitated.

Figure 2:
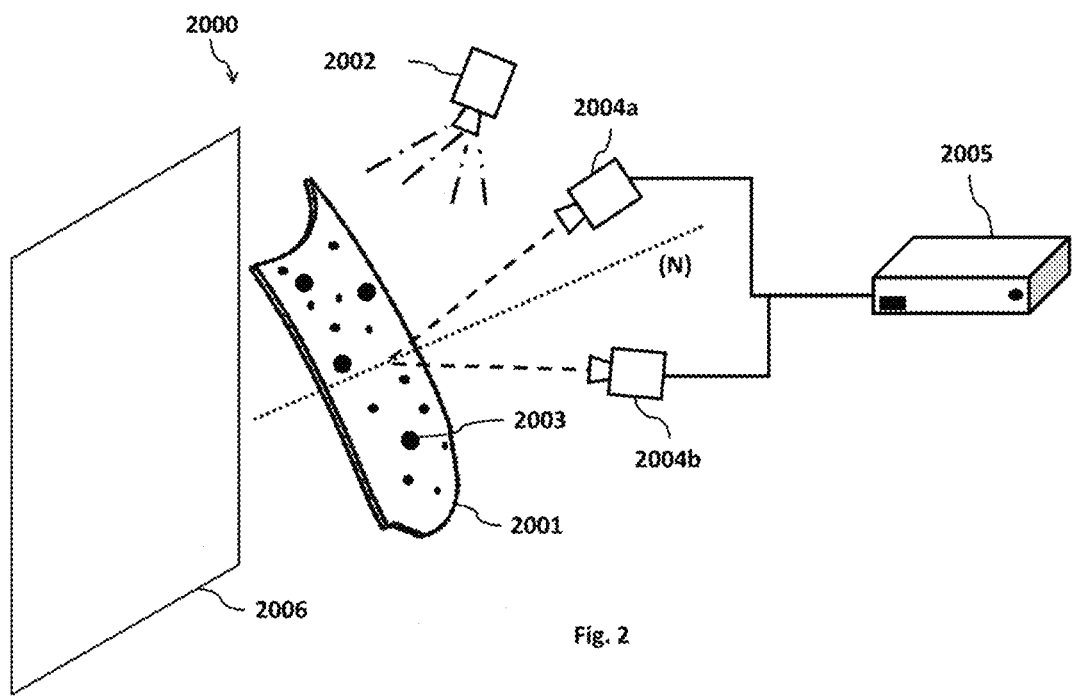
FIG. 2 schematically depicts one embodiment of a method and a system for measuring the three-dimensional geometry of a glazing in accordance with the invention.
Figure 3:
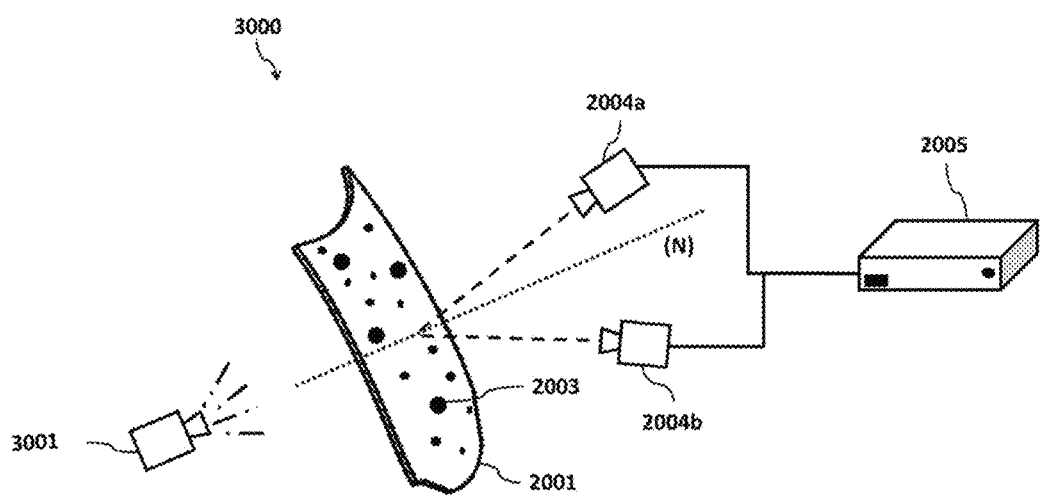
FIG. 3 schematically depicts another embodiment of a method and a system for measuring the three-dimensional geometry of a glazing in accordance with the invention.

As shown in FIGS. 2 and 3, another subject of the present invention is a process 2000, 3000 for measuring the three-dimensional geometry of a transparent glazing 2001 based on mineral glass, said method comprising the following steps:
(a) projecting 2002, 3001 a random light pattern 2003 onto the surface of the glazing 2001;
(b) simultaneously and independently acquiring at least two digital images IM-1, IM-2 of said pattern 2003 by two digital optical devices 2004a, 2004b oriented at two different acquisition angles relative to a normal (N) of the glazing 2001;
(c) determining the three-dimensional geometry of the glazing 2001 using a method, implemented by computer 2005, for determining the three-dimensional geometry of a transparent glazing 2001 based on a mineral glass as described previously, and wherein the digital images acquired IM-1, IM-2 in step (b) are provided as input data I1001, I1002.

Step (a) of projecting 2002, 3001 the random light pattern 2003 onto the surface of the glazing 2001 can be carried out using any suitable projection device. The projection can be carried out in reflection 2002 or in transmission 3001.

The random light pattern 2003 can advantageously be formed of light dots randomly distributed on the surface of the glazing 2001 and have a random distribution in terms of size and light density. The embodiment is advantageous since it makes it possible both for the surface to be partially opacified and for digital images of the surface to be obtained of optimal quality for executing the calculation steps of the method according to the invention.

The measuring process according to the invention is advantageous in that it makes it possible to determine the shape or the three-dimensional geometry of a transparent glazing which radiates under the effect of temperature. It is particularly suitable for a glazing, the temperature of which is such that the wavelength corresponding to the maximum radiance thereof is between 2 μm and 6 μm.

In particular, it is suitable for glazings in the automotive field, such as windscreens or side or rear windows. These glazings are based on soda-lime-silica mineral glass; during their shaping, the temperature of the glazing is between 300° C. and 1000° C., in particular between 400° C. and 650° C., depending on the composition of the glass.

The temperature of the glazing or of the furnace wherein it is shaped can be such that the ambient atmosphere is stirred by convection currents. In some cases, these convection currents are liable to adversely affect the acquisition of the digital images of the light pattern. In particular, the quality of the digital images can be degraded by the appearance of artefacts of movement of the pattern.

The digital optical devices 2004a, 2004b can then advantageously be provided with neutral-density filters, the density being between 2 and 400, preferably between 8 and 64. These filters make it possible to reduce the effect of the convection currents of the ambient atmosphere on the quality of the digital images acquired by the digital optical devices. Neutral-density filter is intended to mean an optical filter which uniformly absorbs the electromagnetic radiation of an electromagnetic spectrum, particularly the visible spectrum, regardless of the wavelength of the radiation of this spectrum.

Depending on the composition of the mineral glass forming the glazing, the temperature of the glazing may also be such that the intensity of its radiation, particularly in the visible spectrum, can cause saturation of the light-sensitive electronic components of the digital optical devices. For example, for the glazings based on soda-lime-silica glass, the saturation may appear when their temperature is around 700-800° C. The projection 2002, 3001 of the random light pattern 2003 and the acquisition of the images can then advantageously be carried out in a wavelength range of the electromagnetic spectrum of between 435 nm and 530 nm, in particular between 465 nm and 490 nm. The radiation of the glazing based on mineral glass is generally reduced in this range of the electromagnetic spectrum.

In order to form a random light pattern, the process according to the invention can advantageously comprise, before step (a), a step of dispersing a pulverulent material, and the projection 2002, 3001 of the random light pattern 2003 in step (a) is carried out by illuminating, with visible light, a pulverulent material dispersed on the surface of the glazing. This embodiment can particularly be readily implemented in common bending methods in which a pulverulent material, also referred to as interlayer powder, is dispersed between the surfaces of several stacked glass sheets which are shaped simultaneously. This interlayer powder is generally based on magnesium and/or calcium carbonates.

The illumination of the pulverulent material can be carried out in two different ways, in transmission or in reflection at a projection angle of between 35° and 55°, in particular between 40° and 50°, preferably at a projection angle of 45°, relative to a normal to the surface of the glazing. Illumination in reflection at a projection angle of between 35° and 55°, in particular between 40° and 50°, preferably at a projection angle of 45°, can be preferred because it makes it possible to limit the specular reflection towards the digital optical devices for acquiring the digital images of the random light pattern.

Depending on the composition of the mineral glass forming the glazing, when the temperature of the glazing is such that the intensity of its radiation, particularly in the visible spectrum, may cause saturation of the light-sensitive components of the digital optical devices, the illumination can advantageously be carried out in a wavelength range of the electromagnetic spectrum of between 435 nm and 530 nm.

In one embodiment of the process of the invention, a background 2006 which absorbs the visible spectrum can advantageously be placed behind the glazing on the side opposite to that of digital optical devices. The absorbent background makes it possible to improve the contrast between the light pattern projected on the surface of the glazing and the environment of the glazing. The quality of the digital images acquired can thus be improved.

The process according to the invention is advantageous for determining the three-dimensional geometry of a transparent glazing based on mineral glass. It is particularly suitable for measuring the three-dimensional geometry of a bent or curved glazing. This type of shape is commonly used for glazings in the automotive field, particularly for windscreens.

A system 2000, 3000 for implementing a measuring process in accordance with the invention can comprise:
a projector 2002, 3002 configured to project a random light pattern 2003 onto a glazing 2001 based on transparent mineral glass;

at least two digital optical devices 2004*a*, 2004*b* oriented at two different acquisition angles relative to a normal (N) to the surface of the glazing, configured for the simultaneous and independent acquisition of at least two digital images IM-1, IM-2 of the random light pattern 2003;

a data processing unit 2005 for determining the three-dimensional geometry of a glazing 2001 based on a transparent mineral glass, said processing unit 2005 using, as input data I1001 and I1102, a digital reference model MOD-R of the three-dimensional geometry of the glazing, and the digital images IM-1 and IM-2 acquired by the digital optical devices 2004*a*, 2004*b*, and providing, as output data O1001, a digital model MOD-R' of the three-dimensional geometry of the glazing 2001;

said data processing unit comprising means for implementing a method 1000 comprising the following steps:

(a) a step S1001 of anchoring ANCR the digital reference model MOD-R to one of the digital images IM-1 and IM-2 by means of at least three anchoring points (this step provides, as output data D1001, a digital model denoted MOD-A which is used as input data for step S1002);

(b) a step S1002 of calculating, based on the digital reference model MOD-R, two virtual digital images IM-V1 and IM-V2 of the glazing at the same two observation angles as those of the two digital images IM-1 and IM-2 provided as input data I1002 (this step provides, as output data D1002, two virtual digital images IM-V1 and IM-V2 which are used as input data for step S1003);

(c) a step (S1003) of calculating the residues (C-RES) corresponding to the differences between the virtual images obtained in step (b) and the digital images (IM-1, IM-2) provided as input data (I1002) (this step provides, as output data D1003, the residues RES which are used as input data for step S1004);

(d) a step of iterating S1004 steps (b) and (c), each iteration comprising a step of calculating C-MOD a modified digital model MOD-R' based on a prior modified digital model MOD-R' provided as input data D1004 for said step (d), so as to minimise the values of the residues RES until they are under a previously defined threshold value σ (at each iteration S1004, the calculation step C-MOD provides, as output data D1004, a digital model which is used retroactively as input data for step S1002), the modified digital model MOD-R' then corresponding to the output data O1001.

The invention claimed is:

1. A computer-implemented method for determining the three-dimensional geometry of a transparent glazing based on a mineral glass, said method using, as input data:
   a digital reference model of the three-dimensional geometry of the glazing, and
   at least two digital images of a random light pattern projected onto a surface of the glazing, said at least two digital images representing said pattern at two different observation angles relative to a normal to the surface of the glazing;
   said method providing, as output data, a digital model of the three-dimensional geometry of said glazing;
   said method comprising:
(a) a step of anchoring the digital reference model to one of the digital images by at least three anchoring points;

(b) a step of calculating, based on the digital reference model, two virtual digital images of the glazing at the same two observation angles as those of the two digital images provided as input data;

(c) a step of calculating residues corresponding to differences between the two virtual images obtained in step (b) and the at least two digital images provided as input data, and (d) a step of iterating steps (b) and (c), each iteration comprising a step of calculating a modified digital model based on a prior modified digital model provided as input datum for said step (d), so as to minimise values of the residues until the values are under a previously defined threshold value σ, the modified digital model then corresponding to an output datum.

2. The method according to claim 1, wherein the random light pattern is formed of light dots randomly distributed on the surface of the glazing and has a random distribution in terms of size and light density.

3. A non-transitory computer readable storage medium comprising instructions which, when the instructions are executed by a computer, cause said computer to execute the steps of the method according to claim 1.

4. The process according to claim 1, wherein the glazing has a temperature such that a wavelength corresponding to a maximum radiance thereof is between 2 μm and 6 μm.

5. The process according to claim 4, wherein the glazing is based on soda-lime-silica glass and the temperature of the glazing is between 300° C. and 1000° C.

6. The process according to claim 5, wherein the temperature of the glazing is between 400° C. and 650° C.

7. The process according to claim 1, wherein the at least two images that are used as input data are obtained by projecting the random light pattern onto the surface of the glazing and acquiring the at least two images in a wavelength range of the electromagnetic spectrum of between 435 nm and 530 nm.

8. The process according to claim 7, wherein the wavelength range of the electromagnetic spectrum is between 465 nm and 490 nm.

9. A process for measuring the three-dimensional geometry of a transparent glazing based on mineral glass, said process comprising the following steps:
   (a) projecting a random light pattern onto a surface of the glazing;
   (b) simultaneously and independently acquiring at least two digital images of said random light pattern by two digital optical devices oriented at two different acquisition angles relative to a normal of the surface of the glazing, and
   (c) determining the three-dimensional geometry of the glazing using a method, implemented by computer, for determining the three-dimensional geometry of a transparent glazing based on a mineral glass,
      wherein the at least two digital images acquired in step (b) and a digital reference model of the three-dimensional geometry of the glazing are provided as input data of the method for determining the three-dimensional geometry of a transparent glazing based on a mineral glass, and
      wherein the method for determining the three-dimensional geometry of a transparent glazing based on a mineral glass includes
         (i) a step of anchoring the digital reference model to one of the at least two digital images by at least three anchoring points;

(ii) a step of calculating, based on the digital reference model, two virtual digital images of the glazing at the same two observation angles as those of the at least two digital images provided as input data;

(iii) a step of calculating residues corresponding to differences between the two virtual images obtained in step (ii) and the at least two digital images provided as input data, and (iv) a step of iterating steps (ii) and (iii), each iteration comprising a step of calculating a modified digital model based on a prior modified digital model provided as input datum for said step (iv), so as to minimise values of the residues until the values are under a previously defined threshold value $\sigma$, the modified digital model then corresponding to an output datum.

10. The process according to claim 9, wherein the light pattern is formed of light dots randomly distributed on the surface of the glazing and has a random distribution in terms of size and light density.

11. The process according to claim 9, wherein the two digital optical devices are provided with neutral-density filters, the density being between 2 and 400.

12. The process according to claim 11, wherein the density is between 8 and 64.

13. The process according to claim 9, further comprising, before step (a), a step of dispersing a pulverulent material, and wherein said projecting of the random light pattern in step (a) is carried out by illumination, with visible light, a pulverulent material dispersed on the surface of the glazing.

14. The process according to claim 13, wherein the illumination is carried out in transmission.

15. The process according to claim 13, wherein the illumination is carried out in reflection at a projection angle of between 35° and 55° relative to the normal to the surface of the glazing.

16. The process according to claim 13, wherein the illumination is carried out in a wavelength range of the electromagnetic spectrum of between 435 nm and 530 nm.

17. The process according to claim 9, wherein a background which absorbs the visible spectrum is placed behind the glazing on a side opposite to that of the two digital optical devices.

18. The process according to claim 9, wherein the glazing is a curved glazing.

19. The process according to claim 9, wherein the at least two digital images are acquired when the mineral glass of the glazing is at a temperature between 300° C. and 1000° C. and the glazing is manufactured on a glass production line, the method further comprising detecting optical defects and/or aberration in the glazing with the determined three-dimensional geometry of the glazing.

20. A system for implementing a process according to claim 9, said system comprising:

a projector configured to project a random light pattern onto a surface of a glazing based on transparent mineral glass;

at least two digital optical devices oriented at two different acquisition angles relative to a normal to the surface of the glazing, configured for simultaneous and independent acquisition of at least two digital images of the random light pattern;

a data processing unit for determining a three-dimensional geometry of a glazing based on a transparent mineral glass, said data processing unit using, as input data, a digital reference model of the three-dimensional geometry of the glazing, and the at least two digital images acquired by the digital optical devices, and providing, as output datum, a digital model of the three-dimensional geometry of the glazing;

said data processing unit comprising a non-transitory computer readable storage medium comprising instructions for implementing a method comprising the following steps:

(a) a step of anchoring the digital reference model to one of the at least two digital images by at least three anchoring points;

a step of calculating, based on the digital reference model, two virtual digital images of the glazing at the same two observation angles as those of the at least two digital images provided as input data;

a step of calculating residues corresponding to differences between the virtual images obtained in step (b) and the at least two digital images provided as input data;

a step of iterating steps (b) and (c), each iteration comprising a step of calculating a modified digital model based on a prior modified digital model provided as input datum for said step (d), so as to minimise the values of the residues until the the values are under a previously defined threshold value $\sigma$, the modified digital model then corresponding to the output datum.

* * * * *